United States Patent [19]

Blizzard et al.

[11] Patent Number: 4,906,695

[45] Date of Patent: Mar. 6, 1990

[54] PRESSURE-SENSITIVE ADHESIVES CONTAINING AN ALKOXY-FUNCTIONAL SILICON COMPOUND

[75] Inventors: John D. Blizzard, Bay City; Terence J. Swihart, Essexville, both of Mich.

[73] Assignee: Dow Corning Corporation, Midland, Mich.

[21] Appl. No.: 216,609

[22] Filed: Jul. 8, 1988

[51] Int. Cl.$^4$ .................................... C08F 8/00
[52] U.S. Cl. .................................... 525/100; 525/104; 525/105; 525/454; 525/474; 156/310; 156/327; 156/329; 427/387; 428/420
[58] Field of Search ............... 525/100, 105, 104, 474, 525/454; 156/310, 327, 329; 427/387; 428/420

[56] References Cited

U.S. PATENT DOCUMENTS

| | | | |
|---|---|---|---|
| 2,814,601 | 11/1957 | Currie et al. | 260/29.1 |
| 3,644,245 | 2/1972 | Flanagan et al. | 260/23 |
| 3,657,379 | 4/1972 | Hilbelink et al. | 260/824 |
| 3,707,518 | 7/1968 | Bemmels et al. | 260/29.6 |
| 4,125,504 | 11/1978 | Wolinski et al. | 156/310 |
| 4,151,319 | 4/1979 | Sackoff et al. | 428/40 |
| 4,463,115 | 7/1984 | Hirose et al. | 524/188 |
| 4,500,584 | 2/1985 | Modic | 428/145 |
| 4,581,281 | 4/1986 | Gerace | 427/215 |
| 4,593,068 | 6/1986 | Hirose et al. | 525/100 |
| 4,665,127 | 5/1987 | Hirose et al. | 525/100 |
| 4,693,935 | 9/1987 | Mazurek | 428/352 |

FOREIGN PATENT DOCUMENTS

| | | |
|---|---|---|
| 3219442 | 12/1982 | Fed. Rep. of Germany . |
| 56-005867 | 5/1981 | Japan . |
| WO/8703477 | 6/1987 | World Int. Prop. O. . |

*Primary Examiner*—Melvyn I. Marquis
*Assistant Examiner*—Ralph H. Dean, Jr.
*Attorney, Agent, or Firm*—Alexander Weitz

[57] ABSTRACT

The invention relates to a method of contacting two components to form a pressure-sensitive adhesive (PSA) construction, wherein the first component comprises a conventional PSA modified with an alkoxy-functional silicon compound and the second component comprises the same PSA modified with a cure agent for the alkoxy-functional silicon compound. The method provides improved adhesive bond strength over the unmodified PSA which generally increases with time.

24 Claims, No Drawings

PRESSURE-SENSITIVE ADHESIVES CONTAINING AN ALKOXY-FUNCTIONAL SILICON COMPOUND

The present invention relates to pressure-sensitive adhesives and an improved method for forming a pressure-sensitive adhesive construction. More particularly, the present invention relates to a method of contacting two distinct components to form the pressure-sensitive adhesive construction, wherein an alkoxy-functional silicon compound is incorporated in the first component and a cure agent for the alkoxy-functional silicon compound is incorporated in the second component.

BACKGROUND OF THE INVENTION

It is well known in the adhesives art that significant improvement in adhesion to various substrates can be obtained by incorporating various adhesion promoters into adhesive compositions or employing such adhesion promoters in primer compositions for coating the substrate. Development of a wideranging adhesives art has benefited from this method of adhesion improvement and various organosilanes have been typically employed as the adhesion promoter.

Organosilanes which are useful in these applications generally contain hydrolyzable groups (e.g., halogen, alkoxy) attached to the silicon atom thereof which generate silanol groups upon contact with ambient moisture, and thus readily form chemical and/or physical bonds with mineral and metal surfaces. Also attached to the silicon of the organosilane adhesion promoter is an organic moiety which is reactive with, or at least shows some affinity towards, one of the components of the adhesive (usually the polymer). This latter requirement usually limits the practical utility of a specific organosilane to particular adhesive-substrate combinations. In this way, a chemical or physical "molecular bridge" is believed to be formed between the adhesive and the substrate which results in the observed macroscopic improvement in adhesion.

Thus, for example, U.S. Pat. No. 3,644,245 to Flanagan et al. discloses hot melt adhesive compositions having improved adhesion under conditions of high humidity. These compositions comprise a synthetic polymer base and hydrolyzable silanes containing such organic groups as phenyl, vinyl, epoxy, mercapto, amino, ethyl, methyl and methacryloxypropyl.

Additionally, the adhesion to a substrate, as well as the cohesive strength of an adhesive composition, may be augmented by at least partially cross-linking the adhesive. Various examples of this method exist in the art, which method is illustrated by U.S. Pat. No. 3,657,379 to Hilbelink et al. This disclosure teaches adhesive systems comprising separated reactive components wherein (1) a first reactive polymer is mixed with a curing agent for a second reactive polymer to yield one component and (2) a second reactive polymer is mixed with a curing agent for the first reactive polymer to form another component. When the reactive materials from the two components are mixed, the curing agents react with their respective reactive polymers to give strong adhesive bonds.

A distinct category of adhesives which generally comprises natural or synthetic rubbers and resin tackifiers is known in the art as "pressure-sensitive adhesives" (PSAs). PSAs uniquely maintain a permanent "tack" which provides a bond of measurable strength immediately upon contact with another surface. Again, adhesion to a substrate, as well as the cohesive strength of the PSA composition itself, can be improved by curing the PSA.

A cured PSA based on a polyether having at least one silicon-containing hydrolyzable group in its molecule is disclosed by Hirose et al. in U.S. Pat. No. 4,463,115. This composition also contains a tackifier and, optionally, a silanol condensation catalyst for accelerating the curing reaction. It is stated that the resulting PSA has good adhesive properties and can be prepared substantially without the use of a solvent.

In a subsequent U.S. Pat. No. 4,665,127, Hirose et al. extended the above concept to include a wide variety of polymers having at least one reactive silicon-containing group combined with an organic aluminum or organic zirconium catalyst. These PSA compositions are said to have excellent heat resistance and releasability from substrates such as a silicone-coated release paper.

In U.S. Pat. No. 3,707,518, Bemmels et al. disclose a self cross-linking pressure-sensitive acrylate adhesive and tape which comprises a copolymer that includes a small amount of an alkoxy silyl polymerizable crosslinking monomer. Also included in these compositions is 2–6 parts by weight of an acid monomer which acts as a built-in catalyst and causes the adhesive copolymer to cure at ordinary temperatures.

Aside from silicone-based PSAs, the use of silanes as adhesion promoters or compositions wherein reactive silicon groups are chemically attached to organic molecules to promote cure therebetween, silicones are generally known in the art to be adhesive materials (i.e., they impart good release of adhesives) and have, indeed, been widely employed in release liners for pressure-sensitive tape. Surprisingly, as disclosed in two copending applications (Ser. No. 181,763, filed on Apr. 14, 1988; and Ser. No. 189,004, filed on May 2, 1988), now U.S. Pat. No. 4,831,080, Blizzard and Swihart discovered a method for contacting two components to form a pressure-sensitive adhesive (PSA) construction, wherein the first component comprises a conventional PSA and a reactive organopolysiloxane and the second component comprises the PSA and a cure agent for the organopolysiloxane. The method provides improved adhesion, which generally increases with the passage of time, over the unmodified PSA.

SUMMARY OF THE INVENTION

It has now been further discovered that certain alkoxy-functional silicon compounds may also be employed according to the methods described by Blizzard and Swihart, cited supra. Again, the augmented adhesion provided by the compositions of the present invention has generally been found to increase with time, contra the case wherein only silanes of the prior art, or cure agents alone, are incorporated in pressure-sensitive adhesive compositions.

The present invention, therefore, relates to a method for forming a pressure-sensitive adhesive construction comprising: contacting a first component comprising
(I) a pressure-sensitive adhesive; and
(II) an alkoxy-functional silicon compound selected from the group consisting of
  (a) at least one alkoxysilane having the general formula $$R'_g Si(OR)_{4-g}$$

in which R' is a monovalent hydrocarbon group having 1 to 10 carbon atoms, R is an alkyl radicals having 1 to 4 carbon atoms and g can have an average value of 0 to 3 inclusive, and (b) a partially hydrolyzed condensate of said alkoxysilane (a), with a second component comprising
(III) said pressure-sensitive adhesive; and
(IV) a cure agent for said alkoxy-functional silicon compound.

This invention further relates to a composition comprising the pressure-sensitive adhesive and the alkoxy-functional silicon compound employed in the above described method.

DETAILED DESCRIPTION OF THE INVENTION

In the method of the present invention, a first component comprising (I) a pressure-sensitive adhesive (PSA) and (II) an alkoxy-functional silicon compound is contacted with a second component comprising (III) the same pressure-sensitive adhesive and (IV) a cure agent for the alkoxy-functional silicon compound to form a PSA construction. While not wishing to be bound by any particular mechanism, it is believed that after the PSA construction is formed the cure agent interacts with the alkoxy-functional silicon compound to provide a "permanent set" to the adhesive system. Permanent set, as used herein, refers to the irreversible increase with time of the adhesive bond between the first and second components. This interaction can, of course, be hastened at elevated temperatures. The individual components, however, may generally be stored for prolonged periods under ambient conditions as long as they are not in contact with each other.

As far as is known, the exact nature of the pressure-sensitive adhesive (I) employed in the method and composition of the present invention is not critical to operability. The only limitation to this general operability is that the PSA have a reasonable degree of compatibility with the alkoxy-functional silicon compound (II) and the cure agent (IV), each described infra. By compatibility it is meant that the PSA components are not subject to phase separation upon standing and remain as homogeneous dispersions or solutions. Thus, it is believed that any of the PSAs known in the art will function satisfactorily herein. These PSAs are generally based on a natural or synthetic rubber which has been mixed with a tackifier resin and, optionally, with various fillers, plasticizers, extender oils, catalysts, preservatives, antioxidants, stabilizers, or other ingredient normally employed in the preparation of PSAs. The PSAs suitable for use in the methods and compositions of the present invention may be based on natural rubber and/or one or more synthetic rubber such as butyl, silicone, acrylic, styrene-butadiene, acrylonitrile-butadiene, polyisobutylene, isoprene, isoprene-isobutylene, chloroprene, polyvinylether, chlorinated and polyurethane rubbers, and the like. Typical resin tackifiers used in conjunction with these rubbers include rosin, hydrocarbon resins, terpene resin, siloxane resin and the like. Particularly preferred PSAs include those based on styrene-butadiene and acrylic polymers.

The pressure-sensitive adhesives of ingredient (I) are well known in the art and further description thereof is considered unnecessary. Many of these materials are available commercially.

Ingredient (II) of the present invention is an alkoxy-functional silicon compound. It may comprise at least one alkoxysilane having the general formula

in which R' is a monovalent hydrocarbon group having 1 to 10 carbon atoms R is an alkyl radicals having 1 to 4 carbon atoms and g can have an average value of 0 to 3 inclusive. Examples of suitable R' groups include alkyl radicals, such as methyl, ethyl, isopropyl, butyl, hexyl and octyl; alkenyl radicals, such as vinyl and allyl; aryl radicals, such as phenyl, tolyl and xylyl; arylalkyl radicals, such as beta-phenylethyl and beta-phenylpropyl; and cycloaliphatic radicals, such as cyclopentyl, and cyclohexyl. Preferably all R' radicals of ingredient (II) are lower alkyl radicals having 1 to 8 carbon atoms and g has a value of one. Preferred R groups in the above structure include methyl, ethyl and propyl radicals, methyl being highly preferred.

Specific examples of the alkoxysilanes include methyltrimethoxysilane, hyexyltriethoxysilane, octyltriethoxysilane, isopropylorthosilicate (i.e., tetraisopropoxysilane), ethylorthosilicate (i.e., tetraethoxysilane) and trimethylmethoxysilane.

Alternatively, alkoxy-functional silicon compound (II) may be a partially hydrolyzed condensate of the above alkoxysilane. These polymeric species may be substantially linear or highly branched in structure, as will readily be appreciated by those skilled in the art. It is preferred that the condensate is an alkyl polysilicate wherein the alkyl group has one to three carbon atoms, such as methyl polysilicate, ethyl polysilicate and propyl polysilicate. Most preferably, the condensate is ethyl polysilicate having a silica content of about 40 weight percent.

The above described alkoxysilanes and condensates thereof are well known in the art and many of these materials are available commercially.

Ingredient (III) of the present invention is the same PSA as ingredient (I).

The cure agent (IV) for the alkoxy-functional silicon compound (II) may be selected from any of the compounds which are known to facilitate the condensation reactions between SiOH groups and SiOR groups in the presence of water. For example, the compounds contemplated may be metal salts of carboxylic acids. Metals such as Pb, Zn, Sb, Fe, Cd, Sn, Ba, Ca, Co and Mn are known to be effective in this regard, particularly the naphthanates, octoates, hexoates, laurates and acetates. Preferred tin salts are dibutyltin diacetate, dibutyltin dilaurate and stannous octoate, particularly the dibutyltin diacetate. Also preferred are the naphthanates of iron and cobalt. These catalysts, and their use in promoting the above-mentioned reactions, are well known in the art.

The cure agent may also be selected from active organometal catalysts such as organotitanates. Preferred agents include tetrabutyl titanate and tetraisopropyl titanate.

Cure agent (IV) can also comprise an aminofunctional silane having the general formula

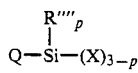

wherein Q is the group

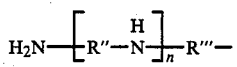

In the above formulas, R" represents a divalent hydrocarbon radical having 2 to 4 carbon atoms such as ethylene, trimethylene or tetramethylene. R'" is a divalent hydrocarbon radical having 3 to 6 carbon atoms, including such groups as trimethylene, tetramethylene, methyltrimethylene, pentamethylene and hexamethylene. The organic group R"" may be selected from the group consisting of methyl, ethyl, propyl, butyl and phenyl radical. The hydrolyzable species X may be selected from methoxy, ethoxy, acetoxy or chlorine groups. Finally, n is an integer between zero and two, inclusive, and p is zero or one. Preferred aminofunctional silanes are N-gamma-aminopropyltriethoxysilane, N-beta-aminoethyl-gamma-amino-isobutyltrimethoxysilane and N-beta-aminoethyl-gamma-aminopropyltrimethoxysilane, the latter being most preferred. When these cure agents bearing the hydrolyzable group X are employed in the second component of the present invention, this component should be stored in a dry environment until it is used. In use, the X group is hydrolyzed by ambient moisture.

Amine-functional silicones may also be employed as the cure agent and have the average general formula

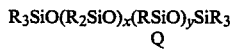

wherein R and Q have their previously defined meanings, x is about 50 to 450 and y is 1 to about 50. It is preferred that all the R groups be methyl. An example of such a preferred amine-functional silicone is represented by the formula

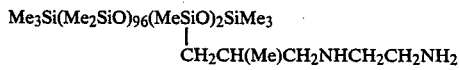

wherein Me denotes a methyl radical.

Cure agent (IV) may also be selected from primary, secondary or tertiary organic amines. Preferred amines are alkyl or aryl amines wherein the alkyl groups contain from 1 to 6 carbon atoms and wherein the aryl group is a phenyl radical. Specific examples of amines useful in the present invention are ethylamine, methylamine, phenylamine, diethylamine, dimethylamine, dibutylamine, diphenylethylamine, phenylmethylamine, butylamine, triethylamine, trimethylamine and tripropylamine. For the purposes of the present invention, triethylenediamine, diethylamine and triethylamine are most preferred.

The amine-functional silanes and siloxanes, as well as the organic amines, are all well known in the art and further descriptions thereof are considered unnecessary.

Although the above described cure agents may generally be employed in the method of the present invention, it has been found that certain PSAs are themselves incompatible with some of them. Thus, for example, some proprietary crosslinkable acrylic PSA compositions gel when they are combined with certain cure agents (see Examples 1–5 and 5–16, infra). The skilled artisan will readily determine which cure agent is compatible with a given PSA.

The compositions of this invention can further comprise typical adjuvants employed in the preparation of pressure sensitive adhesives, such as catalysts, fillers, pigments, dyes, fungicides, bacteriocides, stabilizers, antioxidants and curecontrol additives, if desired.

In order to practice the present invention, the first component is prepared by thoroughly mixing, on a solids basis, from about 0.5 to 25 parts by weight, preferably from about 3 to 10 parts, of the alkoxy-functional silicon compound (II) with 100 parts of the PSA (I). The compositions of the present invention, in which the alkoxy-functional silicon compound (II) is incorporated in a PSA (I), are thus employed as an intermediate in the method of the invention. In a similar manner, the second component of this invention is prepared by thoroughly mixing a curing amount of the cure agent (IV) with 100 parts of the PSA (III). By "curing amount" it is meant at least an amount sufficient to improve the adhesion between the two components as demonstrated by an increase in bond srength and/or increased cohesive failure versus the unmodified PSA. Thus, the amount of cure agent employed will vary according to the nature of the PSA, amount of the alkoxy-functional silicon compound incorporated therein and the particular cure agent selected. Those skilled in the art will readily arrive at optimum formulations by routine experimentation. For example, when the PSA is selected from the preferred systems based on acrylic or styrene-butadiene rubber, from about 0.05 to 15 parts by weight of dibutyltin diacetate are effectively employed per 100 parts by weight of the PSA solids, from about 1 to 10 parts of the dibutyltin diacetate being preferred.

As mentioned above, however, the maximum alkoxy-functional silicon compound content in the first component is limited by compatibility considerations and this ingredient must not separate from the PSA matrix to form its own macroscopic phase. It is, of course, recognized that separate phases may exist at a microscopic level.

As will be readily recognized by those skilled in the art, the PSAs of the present invention may be supplied as a solution or dispersion in an inert organic solvent. By inert it is meant that the solvent does not react with any of the other ingredients of the present invention. The particular solvent selected will generally depend upon the PSA employed. Thus, for a non-polar PSA such as a silicone or a butyl rubber, a non-polar solvent such as toluene, hexane, cyclohexane, mineral spirits or xylene would be appropriate. For a polar PSA such as a urethane or acrylonitrile, a polar solvent such as acetone, ethyl acetate, tetrahydrofuran or dimethylformamide might be used. In general, the PSAs contemplated in the present invention are prepared and marketed in such solvent form and are well known in the art.

Any conventional mixing method may be used to mix the ingredients of the above described components. For example, when the PSA is supplied in solution, relatively low shear mixers such as low speed blade mixers or Pfaudlers may be used. When an all-solids PSA is to be used according to the methods of the present invention, a high intensity mixer, such as a Banbury or roll mill, should be used to insure good dispersion of the ingredients. As far as is known, the order of mixing is not critical to the operability of this invention as long as the alkoxy-functional silicon compound and the cure agent therefor are thoroughly dispersed in the respective PSA compositions.

After the above described first and second components are prepared, said components are contacted in the method of this invention to form a pressure-sensitive adhesive construction. Ordinarily, each component is coated onto a substrate before the contacting step is executed. Thus, this well known method in the art can be practiced using the components disclosed herein by first coating a backer, such as a plastic or metallic film or tape, with the first component of this invention and contacting the resulting composite with the surface of a solid substrate, such as a metal or plastic, which was previously coated with the second component of the present invention. It is also contemplated that a free film of the first and second components of the present invention may be prepared by coating each component onto a release liner as is commonly practiced in the art in certain bonding operations.

It has been found that storage of the separate components of the present invention at high humidity may reduce the ultimate bond strength obtainable when the components are contacted to form the instant constructions. However, when these components are applied to substrates which are relatively impermeable to moisture, the coated substrates may be stored in roll form (e.g., a PSA tape) for extended period without significant degradation of bond strength.

To form such coatings on substrates, solvent-based compositions of this invention can be diluted with a sufficient quantity of a good solvent for the respective components in order to provide a desired coating consistency. As described above, such solvents as hexane, heptane, toluene, xylene, mineral spirits or ketones are suitable for this purpose, the exact choice being based on the nature of the PSAs involved, as is commonly practiced in the art. Coatings of such solvent-based first and second components may be applied to substrates by any of the methods commonly practiced in the coating arts. For example, they may be dipped, brushed, flow coated, blade coated or gravure coated onto a substrate. After coating the backer or solid substrate with the PSA composition, solvent is generally removed by evaporation at ambient temperature or by heating, as commonly practiced in the art. Alternatively, 100% solids coatings are also contemplated herein. These may be applied to a substrate by, e.g., a calendaring operation or one of the above mentioned techniques if the viscosity is low enough.

Those skilled in the art will readily recognize that the constructions of the present invention may be used in many of the applications currently being served by the PSAs described above (i.e., ingredient I of the present invention). With the constructions of the present invention, however, the adhesion is improved and, with the passage of time, the adhesive bond formed between the first and second components will generally increase in strength. This permanent set aspect of the present invention is, of course, an advantage in many applications wherein a strong bond, rather than reversibility thereof, is of primary importance. Such applications include bonding of automotive and decorative trim, permanent fastening devices such as picture hooks, contact paper and labels, electronic component assembly, substrate lamination (e.g., metals, paper, plastic, floor tiles, carpeting), and the like.

EXAMPLES

The following examples are presented to further illustrate the compositions and methods of this invention, but are not to be construed as limiting the invention, which is delineated in the appended claims. All parts and percentages in the examples are on a weight basis and all are reported on a solids basis unless indicated to the contrary.

The following materials were used to prepare the constructions of the present invention.

n-POS is n-propyl orthosilicate.
DBTDA is dibutyltin diacetate cure agent.
TEDA is triethylenediamine.
MTM is methyltrimethoxysilane.
TMMS is trimethylmethoxysilane.
EPS is ethyl polysilicate 40.
OTES is octyltriethoxysilane.
SILANE A is N-(beta-aminoethyl)-gamma-aminopropyltrimethoxysilane.

EXAMPLES 1-5

An acrylic pressure-sensitive adhesive (PSA) solution, GELVA MS 263, was modified to form the constructions of the present invention. GELVA MS 263 (Monsanto Co., St. Louis, MO) is described as a 45% solids solution of an acrylic copolymer in ethyl acetate and hexane. A first component was prepared by thoroughly mixing the indicated amount of n-propyl orthosilicate (n-POS) with this PSA (see Table 1). A second component was prepared by thoroughly mixing dibutyltin diacetate cure agent (DBTDA) with another portion of the PSA solution, also indicated in Table 1. Each of these components was then applied to 5 mil aluminum foil, dried to form a 2 mil-thick film thereon and the coated foil was cut into 1 inch-wide strips. The foil strips bearing the first and second PSA adhesive films were pressed together using a 10 pound steel roller at room temperature to form a lap joint having a ½ inch overlap (i.e., a total of ½ square inch contact surface). The same procedure was followed in the preparation of (Comparative) Example 1, which served as a control and contained no additives in either PSA layer. The lap joints were aged at room temperature for various periods and then tested (at room temperature using a pull rate of ½ inch/minute) to determine shear adhesive strength. Results are presented in Table 1, wherein the shear strength is reported in pounds per square inch (psi).

TABLE 1

|  | (Comparative) Example 1 | Ex. 2 | Ex. 3 | Ex. 4 | Ex. 5 | Ex. 6 |
|---|---|---|---|---|---|---|
| % n-POS in first component (solids basis) | — | 20 | 20 | 10 | 1.0 | 1.0 |
| % DBTDA in second component (solids basis) | — | 10.0 | 0.1 | 1.0 | 10 | 0.1 |
| Shear Adhesion (psi) After: | | | | | | |
| 1 hour | 32 | 102 | 104 | 62 | 50 | 78 |
| 1 day | 41 | 96 | 94 | 74 | 62 | 64 |
| 2 days | 38 | 142 | 88 | 78 | 74 | 44 |
| 7 days | 41 | 146 | 84 | 84 | 98 | 54 |
| 28 days | 29 | 158 | 92 | 96 | 168 | 42 |

*Aluminum foil tore; actual shear strength greater than indicated.

It is seen from Table 1 that the PSA constructions of the present invention provide improved shear adhesive strength versus an unmodified acrylic system.

In experimentation with the above described acrylic PSA, it was observed that certain cure agents (such as stannous octoate, tetrabutyltitanate and N-(beta-aminoethyl)-gamma-aminopropyltrimethoxysilane) tended to gel the PSA solution and would therefore not be suitable for use with this particular PSA in the method of the present invention.

EXAMPLES 7-9

Another acrylic pressure-sensitive adhesive (PSA) solution, 76 RES 9105, was modified to form the constructions of the present invention as described in Examples 1-6. 76 RES 9105 (Unocal Chemicals Division, Schamburg, IL) is described as a high performance "self-crosslinking" pressure sensitive adhesive which is a 45% solids solution of an acrylic resin polymer in an oxygenated hydrocarbon blend. The first component was modified with n-POS and the second component was modified with either DBTDA or triethylenediamine (TEDA), as indicated in Table 2. Shear adhesion results, determined in the manner of Examples 1-6 using a one inch overlap (i.e., a total of one square inch contact area), appear in Table 2.

TABLE 2

|  | (Comparative) Example 7 | Ex. 8 | Ex. 9 |
|---|---|---|---|
| % n-POS in first component (solids basis) | — | 10 | 10 |
| % DBTDA in second component (solids basis) | — | 1.0 | — |
| % TEDA in second component (solids basis) | — | — | 5.0 |
| Shear Adhesion (psi) |  |  |  |
| After: 1 hour | 66 | 83 | 95* |
| 1 day | 60 | 92* | 87* |
| 2 days | 63 | 96* | 89* |
| 7 days | 64 | 92* | 90* |
| 28 days | 69 | — | — |

*Aluminum foil tore; actual shear strength greater than indicated.

EXAMPLES 10-12

The acrylic PSA of Examples 7-9 was modified in a similar manner using methyltrimethoxysilane (MTM) in the first component and either DBTDA or N-(beta-aminoethyl)-gamma-aminopropyltrimethoxysilane (SILANE A) as the cure agent in the second component. Shear adhesion results, determined as in the previous examples, appear in Table 3.

TABLE 3

|  | Example 10 | Ex. 11 | Ex. 12 |
|---|---|---|---|
| % MTM in first component (solids basis) | 10 | 10 | 10 |
| % DBTDA in second component (solids basis) | — | — | 1.0 |
| % SILANE A in second component (solids basis) | 5.0 | 1.0 | — |
| Shear Adhesion (psi) |  |  |  |
| After: 1 hour | 99* | 62 | 93 |
| 1 day | 95* | 94* | 95* |
| 2 days | 96* | 88* | 87* |
| 7 days | 87* | 91* | 95* |
| 28 days | — | — | — |

EXAMPLES 13-14

The acrylic PSA of Examples 7-9 was modified in a similar manner using trimethylmethoxysilane (TMMS) in the first component and N-(beta-aminoethyl)-gamma-aminopropyltrimethoxysilane (SILANE A) as the cure agent in the second component. Shear adhesion results, determined as in the previous examples (one inch overlap), appear in Table 4.

TABLE 4

|  | Example 13 | Ex. 14 |
|---|---|---|
| % TMMS in first component (solids basis) | 10 | 10 |
| % SILANE A in second component (solids basis) | 5.0 | 1.0 |
| Shear Adhesion (psi) |  |  |
| After: 1 hour | 99* | 96* |
| 1 day | 103* | 95* |
| 2 days | 92* | 84* |
| 7 days | 99* | 87* |
| 28 days | — | — |

*aluminum foil tore; actual shear strength greater than indicated.

EXAMPLES 15-16

The acrylic PSA of Examples 7-9 was modified in a similar manner using either octyltriethoxysilane (OTES) or ethyl polysilicate 40 (EPS) in the first component and DBTDA as the cure agent in the second component. The EPS (also known as polydiethoxysiloxane) was a purchased product from Petrarch Systems (Bristol, PA) having a stated silica content of 40-42%. Shear adhesion results, determined as in the previous examples (one inch overlap), appear in Table 5.

TABLE 5

|  | Example 15 | Ex. 16 |
|---|---|---|
| % OTES in first component (solids basis) | 10 | — |
| % EPS in first component (solids basis) | — | 10 |
| % DBTDA in second component (solids basis) | 5.0 | 1.0 |
| Shear Adhesion (psi) |  |  |
| After: 1 hour | 80* | 42 |
| 1 day | 87* | 84* |
| 2 days | 91* | 96* |
| 7 days | 84* | 87* |
| 28 days | — | — |

*aluminum foil tore; actual shear strength greater than indicated.

As before, all the compositions of the present invention resulted in improved shear adhesion relative to the control acrylic PSA (Comparison Example 7). In experimentation with the 76 RES 9105 acrylic PSA, it was also observed that certain cure agents (such as stannous octoate, tetrabutyl titanate, iron naphthanate and cobalt naphthanate) tended to gel the PSA solution and would therefore not be suitable for use with this particular PSA in the method of the present invention.

(COMPARATIVE) EXAMPLES 17-20

A styrene-butadiene rubber based PSA solution, DURO-TAK 36-6045, was modified and tested according to the previously outlined procedures wherein the alkoxy-functional silicon compounds shown in Table 6 were added to both PSA components. DURO-TAK 36-6045 (National Starch and Chemical Corp., Bridgewater, NJ) is described as a 48% solids solution in toluene, heptane and isopropyl alcohol having a viscosity of about 5,500 cP. In addition, (Comparative) Example 17 was prepared to illustrate the unmodified styrene-butadiene PSA. Shear adhesion results (one inch overlap) are shown in Table 6.

TABLE 6

|  | (Comp.) Ex. 17 | (Comp.) Ex. 18 | (Comp.) Ex. 19 | (Comp.) Ex. 20 |
|---|---|---|---|---|
| % n-POS in first component (solids basis) | — | 10 | — | — |
| % EPS in first compnent (solids basis) | — | — | 10 | — |
| % MTM in first component (solids basis) | — | — | — | 10 |
| % n-POS in second component (solids basis) | — | 10 | — | — |
| % EPS in second component (solids basis) | — | — | 10 | — |
| % MTM in second component (solids basis) | — | — | — | 10 |
| Shear Adhesion (psi) After: | | | | |
| 1 hour | 7 | 25 | 16 | 8 |
| 1 day | 10 | 19 | 16 | 8 |
| 2 days | 11 | 17 | 16 | 8 |
| 7 days | 9 | 22 | 18 | 11 |
| 28 days | 9 | 25 | 17 | 10 |

As can be seen from the above table, modification of the styrene-butadiene PSA with only the alkoxy-functional silicon compound can raise bond strength to a limited degree. However, this augmentation was found to be considerably less than for PSA constructions of the present invention, as detailed infra.

EXAMPLES 21–23

The styrene-butadiene rubber PSA used in Examples 17–20 was modified by incorporating n-propyl orthosilicate (n-POS) in the first component and DBTDA, iron naphthanate or tin (stannous) octoate in the second component, as indicated in Table 7. Shear adhesion testing results (one inch overlap) are also reported in Table 7.

TABLE 7

|  | Ex. 21 | Ex. 22 | Ex. 23 |
|---|---|---|---|
| % n-POS in first component (solids basis) | 10 | 10 | 10 |
| % DBTDA in second component (solids basis) | 5.0 | — | — |
| % iron naphthanate in second component (solids basis) | — | 5.0 | — |
| % tin octoate in second component (solids basis) | — | — | 5.0 |
| Shear Adhesion (psi) After: | | | |
| 1 hour | 88* | 92* | 91* |
| 1 day | 87* | 92* | 97* |
| 2 days | 86* | — | — |
| 7 days | 89* | — | — |
| 28 days | 88* | — | — |

*aluminum foil tore; actual shear strength greater than indicated.

EXAMPLES 24–26

The styrene-butadiene rubber PSA used in Examples 17–20 was modified by incorporating ethyl polysilicate 40 (EPS) in the first component and DBTDA, iron naphthanate or tin (stannous) octoate in the second component, as indicated in Table 8. Shear adhesion testing results (one inch overlap) are also reported in Table 8.

TABLE 8

|  | Ex. 24 | Ex. 25 | Ex. 26 |
|---|---|---|---|
| % EPS in first component (solids basis) | 10 | 10 | 10 |
| % DBTDA in second component (solids basis) | 5.0 | — | — |
| % iron naphthanate in second component (solids basis) | — | 5.0 | — |
| % tin octoate in second component (solids basis) | — | — | 5.0 |
| Shear Adhesion (psi) After: | | | |
| 1 hour | 94* | 99* | 91* |
| 1 day | 94* | 91* | 92* |
| 2 days | — | — | — |
| 7 days | — | — | — |
| 28 days | — | — | — |

*aluminum foil tore; actual shear strength greater than indicated.

EXAMPLES 27–30

The styrene-butadiene rubber PSA used in Examples 17–20 was modified by incorporating methyltrimethoxysilane (MTM) in the first component and DBTDA, iron naphthanate, tin (stannous) octoate or N-(beta-aminoethyl)-gamma-aminopropyltrimethoxysilane (SILANE A) in the second component, as indicated in Table 9. Shear adhesion testing results (one inch overlap) are also reported in Table 9.

TABLE 9

|  | Ex. 27 | Ex. 28 | Ex. 29 | Ex. 30 |
|---|---|---|---|---|
| % MTM in first component (solids basis) | 10 | 10 | 10 | 10 |
| % DBTDA in second component (solids basis) | 5.0 | — | — | — |
| % iron naphthanate in second component (solids basis) | — | 5.0 | — | — |
| % tin octoate in second component (solids basis) | — | — | 5.0 | — |
| % SILANE A in second component (solids basis) | — | — | — | 5.0 |
| Shear Adhesion (psi) After: | | | | |
| 1 hour | 82* | 96* | 100 | 96* |
| 1 day | 93* | 92* | 91* | 88* |
| 2 days | — | — | — | 85* |
| 7 days | — | — | — | 83* |

TABLE 9-continued

| | Ex. 27 | Ex. 28 | Ex. 29 | Ex. 30 |
|---|---|---|---|---|
| 28 days | — | — | — | — |

*aluminum foil tore; actual shear strength greater than indicated.

EXAMPLE 31

The styrene-butadiene rubber PSA used in Examples 17-20 was modified by incorporating trimethylmethoxysilane (TMMS) in the first component and N-(beta-aminoethyl)-gamma-aminopropyltrimethoxysilane (SILANE A) in the second component, as indicated in Table 10. Shear adhesion testing results (one inch overlap) are also reported in Table 10.

TABLE 10

| | Ex. 31 |
|---|---|
| % TMMS in first component (solids basis) | 10 |
| % SILANE A in second component (solids basis) | 5.0 |
| Shear Adhesion (psi) After: 1 hour | 93* |
| 1 day | 89* |
| 2 days | 101* |
| 7 days | 89* |
| 28 days | 92* |

*aluminum foil tore; actual shear strength greater than indicated.

EXAMPLE 32

The styrene-butadiene rubber PSA used in Examples 17-20 was modified by incorporating 2.0% methyltrimethoxysilane (MTM) in the first component and 0.5% N-(beta-aminoethyl)-gamma-aminopropyltrimethoxysilane (SILANE A) in the second component. The modified PSA components were coated onto 5 mil thick steel foil (also one inch wide). Effect of relative humidity on adhesion performance was evaluated by exposing the coated steel foils to (a) 100% relative humidity (R.H.) at 60° C.; (b) essentially 0% R.H. at room temperature; and, for comparison, (c) ambient conditions. After storage for the times indicated in Table 11, the components were pressed together for one hour and shear tested using a one inch overlap. The percentage of adhesive and cohesive failure was visually estimated and is also reported in Table 11.

TABLE 11

| Storage Condition | Storage Time | Failure Mode | Shear Strength (psi) |
|---|---|---|---|
| 100% R.H. | 1 day | Adhesive | 162 |
| " | 7 days | " | 171 |
| " | 14 days | 80% Adhesive | 128 |
| " | 28 days | — | 127 |
| 0% R.H. | 1 day | 40% Adhesive | 265 |
| " | 7 days | 70% Adhesive | 281 |
| " | 14 days | Cohesive Failure | 285 |
| " | 28 days | — | 302 |
| Ambient | 1 hour | Cohesive Failure | 295 |

It is seen from Table 11 that exposure of the coated PSA foils of the present invention to high humidity reduces ultimate shear adhesion, but the bond strength is still quite high. Furthermore, the coated foils retained their tack irrespective of storage condition.

We claim:

1. A method for forming a pressure-sensitive adhesive construction comprising: contacting a first component comprising
   (I) a pressure-sensitive adhesive; and
   (II) an alkoxy-functional silicon compound selected from the group consisting of
      (a) at least one alkoxysilane having the general formula $R'_g Si(OR)_{4-g}$ in which R' is a monovalent hydrocarbon group having 1 to 10 carbon atoms, R is an alkyl radicals having 1 to 4 carbon atoms and g can have an average value of 0 to 3 inclusive, and
      (b) a partially hydrolyzed condensate of said alkoxysilane (a),
   with a second component comprising (III) said pressure-sensitive adhesive; and
   (IV) a cure agent for said alkoxy-functional silicon compound.

2. The method of claim 1, wherein said pressure-sensitive adhesive is selected from those based on natural, butyl, silicone, acrylic, styrene-butadiene, polyisobutylene, isoprene, isoprene-isobutylene, chloroprene, polyvinylether, chlorinated or polyurethane rubber.

3. The method of claim 1, wherein said alkoxy-functional silicon compound (II) is said alkoxysilane (a) in which R' is an alkyl radical having 1-8 carbon atoms and g is one.

4. The method of claim 3, wherein R has 1-3 carbon atoms.

5. The method of claim 1, wherein R has 1-3 carbon atoms and g has a value of zero.

6. The method of claim 5, wherein said pressure-sensitive adhesive is based on a rubber selected from the group consisting of acrylic and styrene-butadiene polymers.

7. The method of claim 4, wherein said pressure-sensitive adhesive is based on a rubber selected from the group consisting of acrylic and styrene-butadiene polymers.

8. The method of claim 1, wherein said alkoxy-functional silicon compound (II) is said partially hydrolyzed condensate of said alkoxysilane (a) consisting essentially of an alkyl polysilicate in which the alkyl radicals have 1-3 carbon atoms.

9. The method of claim 8, wherein said alkyl polysilicate is ethyl polysilicate having a silica content of about 40 weight percent.

10. The method of claim 8, wherein said pressure-sensitive adhesive is based on a rubber selected from the group consisting of acrylic and styrene-butadiene polymers.

11. The pressure-sensitive adhesive construction prepared by the method of claim 1.

12. The pressure-sensitive adhesive construction prepared by the method of claim 2.

13. The pressure-sensitive adhesive construction prepared by the method of claim 3.

14. The pressure-sensitive adhesive construction prepared by the method of claim 5.

15. The pressure-sensitive adhesive construction prepared by the method of claim 8.

16. A composition comprising:
   (I) a pressure-sensitive adhesive selected from the group consisting of those based on natural, butyl, acrylic, styrene-butadiene, polyisobutylene, isoprene, isoprene-isobutylene, chloroprene, polyvinylether, chlorinated and polyurethane rubber; and (II) from about 0.05 to 25 parts by weight per 100 parts by weight of said pressure-sensitive adhesive of an alkoxy-functional silicon compound selected from the group consisting of (a) at least one alkoxysilane having the general formula $$R'_g Si(OR)_{4-g}$$

in which R' is a monovalent hydrocarbon group having 1 to 10 carbon atoms, R is an alkyl radical having 1 to 4 carbon atoms and g has an average value of 0 to 3 inclusive, and (b) a partially hydrolyzed condensate of said alkoxysilane (a).

17. The composition of claim 16, wherein said alkoxy-functional silicon compound (II) is said alkoxysilane (a) in which R' is an alkyl radical having 1-8 carbon atoms and g is one.

18. The composition of claim 17, wherein R has 1-3 carbon atoms.

19. The composition of claim 16, wherein R has 1-3 carbon atoms and g has a value of zero.

20. The composition of claim 19, wherein said pressure-sensitive adhesive is based on a rubber selected from the group consisting of acrylic and styrene-butadiene polymers.

21. The composition of claim 18, wherein said pressure-sensitive adhesive is based on a rubber selected from the group consisting of acrylic and styrene-butadiene polymers.

22. The composition of claim 16, wherein said alkoxy-functional silicon compound (II) is said partially hydrolyzed condensate of said alkoxysilane (a) consisting essentially of an alkyl polysilicate in which the alkyl radicals have 1-3 carbon atoms.

23. The composition of claim 22, wherein said alkyl polysilicate is ethyl polysilicate having a silica content of about 40 weight percent.

24. The composition of claim 22, wherein said pressure-sensitive adhesive is based on a rubber selected from the group consisting of acrylic and styrene-butadiene polymers.

* * * * *